US010241936B2

(12) United States Patent
Lu et al.

(10) Patent No.: US 10,241,936 B2
(45) Date of Patent: Mar. 26, 2019

(54) METHOD FOR ACTIVELY CONNECTING TO AND COMMUNICATING WITH APPLE DEVICE AND APPLE DEVICE ATTACHMENT

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

(*) Notice: Subject to any disclaimer, the term of this patent is extended or adjusted under 35 U.S.C. 154(b) by 0 days.

(21) Appl. No.: 15/557,151

(22) PCT Filed: Feb. 24, 2016

(86) PCT No.: PCT/CN2016/074480
§ 371 (c)(1),
(2) Date: Sep. 11, 2017

(87) PCT Pub. No.: WO2016/150267
PCT Pub. Date: Sep. 29, 2016

(65) Prior Publication Data
US 2018/0046588 A1    Feb. 15, 2018

(30) Foreign Application Priority Data
Mar. 20, 2015  (CN) .......................... 2015 1 0124370

(51) Int. Cl.
G06F 13/10    (2006.01)
G06F 13/38    (2006.01)
G06F 13/42    (2006.01)

(52) U.S. Cl.
CPC ............ *G06F 13/102* (2013.01); *G06F 13/38* (2013.01); *G06F 13/385* (2013.01); *G06F 13/4282* (2013.01); *G06F 2213/0042* (2013.01)

(58) Field of Classification Search
CPC ...... G06F 13/38; G06F 13/102; G06F 13/385; G06F 13/4282; G06F 2213/0042
See application file for complete search history.

(56) References Cited

U.S. PATENT DOCUMENTS

2010/0231352 A1* 9/2010 Bolton .................. H04L 9/3234
340/5.8
2015/0178236 A1* 6/2015 Sharma ................. G06F 13/385
710/38

(Continued)

*Primary Examiner* — Nimesh G Patel
(74) *Attorney, Agent, or Firm* — Hammer & Associates, P.C.

(57) ABSTRACT

A method for actively initiating a connection to and communicating with an Apple device via USB, relating to the field of communications, and comprising: an Apple device attachment, when detecting access by a USB device, determines whether the accessing USB device is an Apple device (S1); the Apple device attachment establishes a device address for the Apple device (S2); the Apple device attachment acquires the current communication protocol setup of the Apple device, and determines whether the current communication protocol configuration of the Apple device is a preset configuration (S3); the Apple device attachment sets the current communication protocol configuration of the Apple device as the preset configuration (S4); the Apple device attachment notifies the Apple device to register the Apple device attachment to the Apple device (S5); the Apple device attachment establishes a connection with the Apple device (S6); the Apple device attachment periodically queries whether communication data has been sent by the Apple device, and when detecting communication data has been sent by the Apple device, receiving the communication data sent by the Apple device and implementing communication with the Apple device (S7). The present method can actively initiate a connection with an Apple device without using an Apple authentication chip, acting as a primary device implementing communication with the Apple device.

20 Claims, 4 Drawing Sheets

(56) References Cited

U.S. PATENT DOCUMENTS

| | | |
|---|---|---|
| 2015/0293869 A1 | 10/2015 | Lu et al. |
| 2016/0140369 A1* | 5/2016 | Deal ................... G06K 7/10821 |
| | | 713/310 |
| 2016/0170913 A1* | 6/2016 | Kim ..................... G06F 13/102 |
| | | 710/16 |
| 2016/0174275 A1* | 6/2016 | Ji ...................... H04M 1/72527 |
| | | 455/422.1 |
| 2016/0292466 A1* | 10/2016 | Lu ....................... H04L 63/0853 |
| 2018/0220273 A1* | 8/2018 | Lu ......................... H04M 1/725 |

\* cited by examiner

METHOD FOR ACTIVELY CONNECTING TO AND COMMUNICATING WITH APPLE DEVICE AND APPLE DEVICE ATTACHMENT

FIELD OF THE INVENTION

The present invention relates to a method for connecting initiatively to and communicating with an apple device and apple accessory thereof, which belongs to the field of communication technology.

PRIOR ART

In prior art, an Apple device communicates with a device via a private protocol, and a communication method of the apple device is not public, thus, it is hard to communicate with an apple device, even though a device can communicate with the apple device, the device must be a dependent unit of the apple device; at the moment, if a device communicates with an apple device via USB interface, the device must have an apple authentication chip in it, thus it is more expensive and has more constraint.

SUMMARY OF THE INVENTION

The object of the present invention is to provide a method for connecting initiatively to and communicating with an apple device and an apple accessory thereof, which can realize that a device connects to an apple device without an apple authentication chip, thus, it costs less and has less constraint by using the method, and the device can communicate with the apple device as an independent device.

Thus, according to one aspect of the present invention, there is provided a method for connecting initiatively to and communicating with an apple device, including following steps:

S1) determining, by an apple accessory, whether a USB device which is connected to the apple accessory is an apple device when the apple accessory detects that the USB device is connected to the apple accessory, if yes, setting a device address for the apple device, and going to Step S2; otherwise, going back to Step S1;

S2) obtaining, by the apple accessory, a current communications protocol configuration of the apple device, and determining whether the current communications protocol configuration of the apple device is a preset configuration, if yes, going to Step S3; otherwise, setting the current communications protocol configuration of the apple device as the preset configuration, and going to Step S3;

S3) notifying, by the apple accessory, the apple device to register the apple accessory with the apple device, and building a connection with the apple device; and S4) inquiring regularly, by the apple accessory, whether any communication data sent from the apple device exists, receiving the communication data sent from the apple device in the case that the communication data sent from the apple device is inquired, and communicating with the apple device.

Furthermore, in the present method, that the apple accessory determines whether the USB device which is connected to the apple accessory is an apple device specifically includes: the apple accessory sends an obtaining-device-identification request to the connected USB device, and receives a device identification returned from the connected USB device, and then determines whether the received device identification meets a preset condition, if yes, confirming that the connected USB device is an apple device; otherwise, confirming that the connected USB device is not an apple device.

Preferably, that the apple accessory determines whether the received device identification meets the preset condition specifically includes: the apple accessory checks a product identification and a vendor identification in the device identification, the received device identification meets the preset condition in the case that the product identification is in a preset range and the vendor identification equals a first preset value; otherwise, the received device identification does not meet the preset condition.

Preferably, that the apple accessory sets the device address for the apple device specifically includes: the apple accessory sends a setting-address request to the apple device.

Preferably, that the apple accessory obtains the current communications protocol configuration of the apple device specifically includes: the apple accessory generates an obtaining-identification request according to the preset configuration and sends the obtaining-identification request to the apple device, receives a data package group returned from the apple device, looks up a configuration identification package from the data package group, and obtains the current communications protocol configuration of the apple device from the configuration identification package.

Preferably, that the apple accessory sets the current communications protocol configuration of the apple device as the preset configuration specifically includes: the apple accessory generates a setting-identification request according to the preset configuration and sends the setting-identification request to the apple device.

Preferably, after the apple accessory notifies the apple device to register the apple accessory with the apple device, the method further includes: the apple accessory receives a first answer data package returned from the apple device, and determines whether the apple device registers the apple accessory with the apple device successfully according to the first answer data package returned from the apple device, if yes, continues to build the connection with the apple device; otherwise, goes back to Step S1.

Preferably, that the apple accessory determines whether the apple device registers the apple accessory with the apple device successfully according to the first answer data package returned from the apple device specifically includes: the apple accessory determines whether a preset field in the first answer data package returned from the apple device equals to a second preset value, if yes, confirming that the apple device registers the apple accessory with the apple device successfully; otherwise, confirming that the apple device registers the apple accessory with the apple device unsuccessfully.

Preferably, after the apple accessory builds the connection with the the apple device, the method further includes: the apple accessory receives a second answer data package returned from the apple device, and determines whether the apple accessory builds the connection with the apple device successfully according to the second answer data package returned from the apple device, if yes, continues to execute Step S4; otherwise, goes back to Step S1.

Preferably, that the apple accessory determines whether the apple accessory builds the connection with the apple device successfully according to the second answer data package returned from the apple device, specifically includes: the apple accessory determines whether real data, which is included in the second answer data package returned from the apple device, is the preset data, if yes, confirming that the apple accessory builds the connection with the apple device successfully; otherwise, confirming that the apple accessory builds the connection with the apple device unsuccessfully.

According to another aspect of the present invention, there is provided an apple accessory, which specifically includes:

a detecting and determining module which is configured to determine whether a connected USB device is an apple device when the module detects a USB device is connected to the apple accessory, and to set a device address for the apple device in the case that the connected USB device is an apple device;

an obtaining and determining module which is configured to obtain a current communications protocol configuration of the apple device, and to determine whether the current communications protocol configuration of the apple device is a preset configuration, and to set the current communications protocol configuration of the apple device as the preset configuration in the case that the current communications protocol configuration of the apple device is not the preset configuration;

a registering and connecting module which is configured to notify the apple device to register the apple accessory with the apple device, and to build a connection between the apple accessory and the apple device; and a inquiring and communicating module which is configured to inquire regularly whether any communication data sent from the apple device exist, and to receive the communication data sent from the apple device in the case that the module determines that there exist communication data sent from the apple device, and to communicate with the apple device.

Furthermore, that the detecting and determining module determines whether the connected USB device is an apple device specifically includes: the detecting and determining module sends an obtaining-device-identification request to the connected USB device, and receives a device identification returned from the connected USB device, and determines whether the device identification meets a preset condition, if yes, confirming that the connected USB device is an apple device; otherwise, confirming that the connected USB device is not an apple device.

Preferably, that the detecting and determining module determines whether the device identification meets the preset condition specifically includes: the detecting and determining module checks a product identification and a vendor identification, which are included in the obtained device identification, confirming that the obtained device identification meets the preset condition in the case that the product identification is in a preset range and the vendor identification equals to a first preset value; otherwise, confirming that the obtained device identification does not meet the preset condition.

Preferably, that the detecting and the determining module sets the device address for the apple device specifically includes: the detecting and determining module sends a setting-address request to the apple device.

Preferably, that the obtaining and determining module obtains the current communications protocol configuration of the apple device specifically includes: the obtaining and determining module generates an obtaining-identification request according to the preset configuration and sends the obtaining-identification request to the apple device, and receives a data package group returned from the apple device, and looks up a configuration identification package which is in the data package group, and obtains the current communications protocol configuration of the apple device from the configuration identification package.

Preferably, that the obtaining and determining module sets the current communications protocol configuration of the apple device as the preset configuration specifically includes: the obtaining and determining module generates a setting-identification request according to the preset configuration and sends the setting-identification request to the apple device.

Preferably, the registering and connecting module is further configured to receive a first answer data package returned from the apple device, and to determine whether the apple device registers the apple accessory with the apple device successfully according to the first answer data package returned from the apple device.

Preferably, the registering and connecting module is specifically configured to build a connection between the apple accessory and the apple device in the case that the apple device registers the apple accessory with the apple device successfully.

Preferably, that the registering and connecting module determines whether the apple device registers the apple accessory with the apple device successfully according to the first answer data package returned from the apple device specifically includes: the registering and connecting module determines whether a preset field in the first answer data package returned from the apple device equals to the second preset value, if yes, the apple device registers the apple accessory with the apple device successfully; otherwise, the apple device registers the apple accessory with the apple device unsuccessfully.

Preferably, the registering and connecting module is further configured to receive a second answer data package returned from the apple device, and to determine whether the connection with the apple device is built successfully according to the second answer data package returned from the apple device.

Preferably, the inquiring and communicating module is specifically configured to inquire regularly whether any communication data sent from the apple device exists when the registering and connecting module determines that the connection with the apple device is built successfully, and to receive the communication data sent from the apple device when there exists communication data sent from the apple device, and to communicate with the apple device.

Preferably, that the registering and connecting module determines whether the connection with the apple device is built successfully according to the second answer data package returned from the apple device specifically includes: the registering and connecting module determines whether the real data, which is included in the second response data package, is the preset data, if yes, the apple accessory connects to the apple device successfully; otherwise, the apple accessory connects to the apple device unsuccessfully.

According to the present invention, a device can connect to an apple device initiatively without an apple authentication chip, and after the connection successes, the device can communicate with the apple device as a master device, thus by the method, it can be more convenient and cost less.

BRIEF DESCRIPTION OF ACCOMPANYING DRAWINGS

The technical solution in the Embodiments of the present invention will be further described more clearly and completely with the drawings of the present invention. Apparently, the drawings described herein are just for a few Embodiments of the present invention. On the basis of the drawings, other possible drawings can be made by those skilled in the art without any inventive work.

DETAILED DESCRIPTION OF THE INVENTION

The technical solution in the Embodiments of the present invention is further described more clearly and completely with the drawings of the present invention. Apparently, Embodiments described herein are just a few Embodiments of the present invention. On the basis of Embodiments of the invention, all other related Embodiments made by those skilled in the art without any inventive work belong to the scope of the invention.

Embodiment 1

Figure 1:
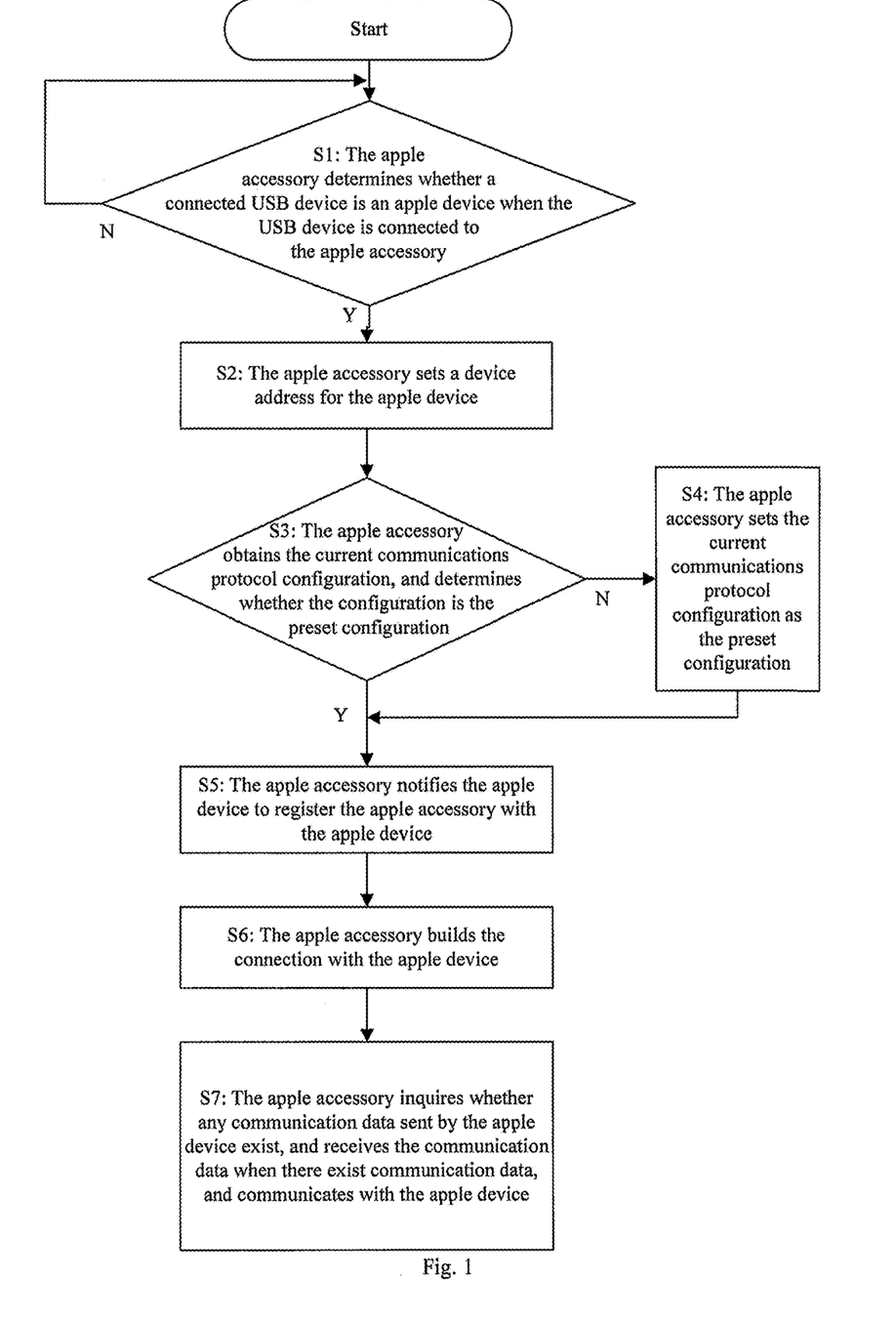
FIG. 1 provides a flow chart of a method for connecting to an apple device initiatively and communicating with the apple device according to Embodiment 1 of the present invention.

Embodiment 1 of the present invention provides a method for connecting to an apple device initiatively and communicating with the apple device, as shown in FIG. 1, the method includes:

Step S1, the Apple device accessory determines whether a USB device is an apple device when an apple accessory detects that the USB device is connected to the apple accessory, if yes, goes Step S2; otherwise, goes back to Step S1;

Step S2, the apple accessory sets a device address for the apple device;

Step S3, the apple accessory obtains a current communications protocol configuration of the apple device, and determines whether the current communications protocol configuration of the apple device is a preset configuration, if yes, goes to Step S5; otherwise, goes to Step S4;

specifically, the preset configuration is one type of configuration, which is supported by the apple device.

Step S4, the apple accessory sets the current communications protocol configuration of the apple device as a preset configuration, and Step S5 is executed;

Step S5, the apple accessory notifies the apple device to register the apple accessory with the apple device;

in Embodiment 1, after the apple accessory notifies the apple device to register the apple accessory with the apple device, the method further includes: the apple accessory receives a first answer data package returned from the apple device, and determines whether the apple device registers the apple accessory with the apple device successfully according to the first answer data package returned from the apple device, if yes, goes to Step S6; otherwise, the connection is not built, and goes back to Step S1.

Step S6, the apple accessory builds a connection with the apple device;

in Embodiment 1, after the apple accessory builds a connection with the apple device, the method further includes: the apple accessory receives a second answer data package returned from the apple device, and determines whether the connection with the apple device is built successfully according to the second answer data package returned from the apple device, if yes, goes to Step S7; otherwise, the connection is not built, and goes back to Step S1.

Step S7, the apple accessory inquires regularly whether any communication data sent from the apple device exists, and receives the communication data sent from the apple device in the case that there exists communication data sent from the apple device, and communicates with the apple device.

In Embodiment 1, the apple accessory has a power supply itself, and can supply power for the apple device which connects to the apple accessory.

Embodiment 2

Figure 2:
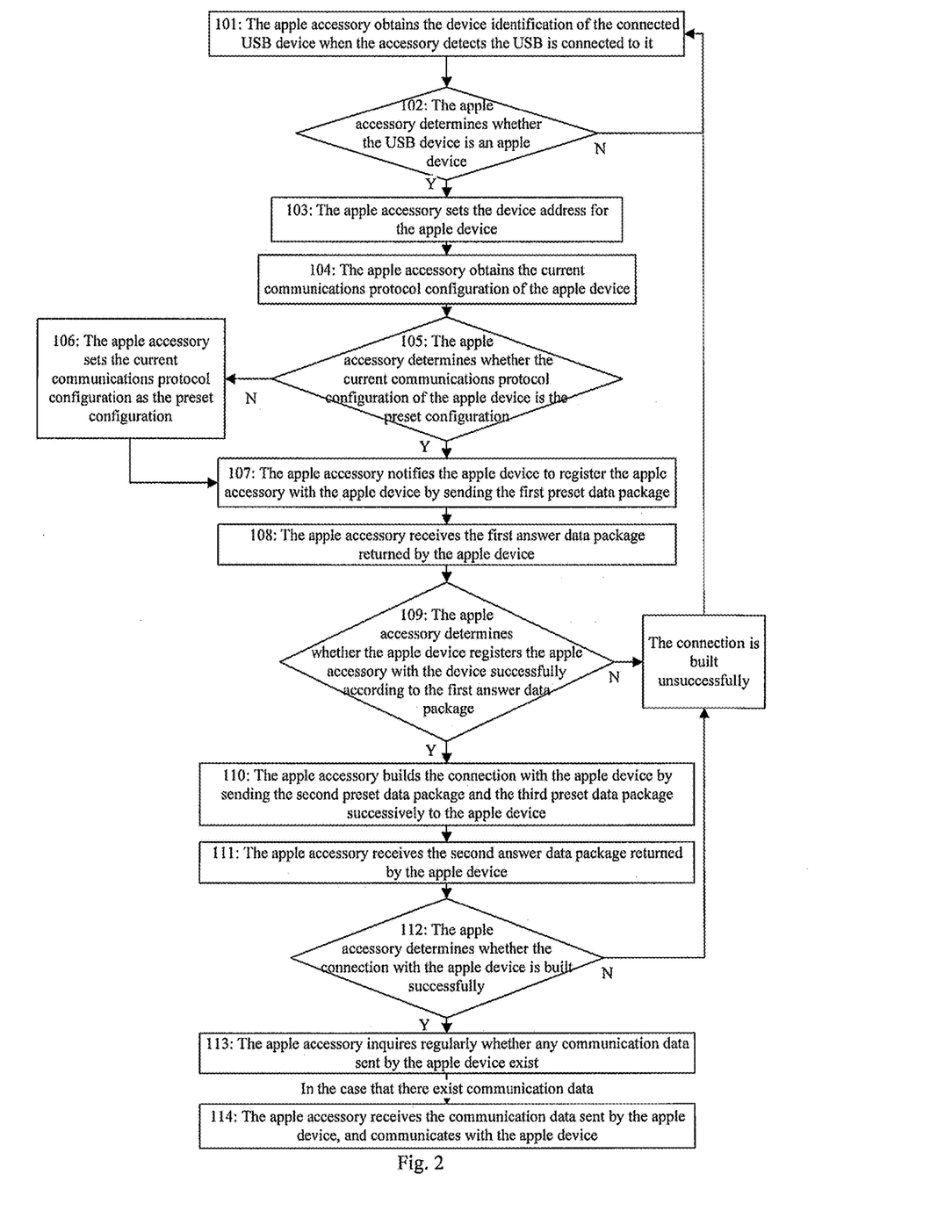
FIG. 2 provides a flow chart of a method for connecting to an apple device initiatively and communicating with the apple device according to Embodiment 2 of the present invention.

Embodiment 2 of the present invention provides a method for connecting to an apple device initiatively and communicating with the apple device, as shown in FIG. 2, the method includes:

Step 101, the apple accessory obtains a device identification of a USB device in the case that the apple accessory detects that the USB device is connected to it;

specifically, Step 101 includes: the apple accessory sends an obtaining-device-identification request to the connected USB device when the apple accessory detects the USB device is connected to the apple accessory, and receives a device identification returned from the connected USB device;

in Embodiment 2, the obtaining-device-identification request specifically is 80 06 00 01 00 00 40 00h.

Step 102, the apple accessory determines whether the connected USB device is an apple device according to the obtained device identification, if yes, goes to Step 103; otherwise, goes back to Step 101;

specifically, Step 102 includes: the apple accessory determines whether the obtained device identification meets a preset condition, if yes, the connected USB device is an apple device; otherwise, the connected USB device is not an apple device;

in Embodiment 2, that the apple accessory determines whether the obtained device identification meets the preset condition includes: the apple accessory determines whether a product identification (PID) and a vendor identification (VID) in the device identification meet the condition that $1290 \leq PID \leq 12afh$ and $VID=05ach$, if yes, the obtained device identification meets the preset condition; otherwise, the obtained device identification does not meet the preset condition;

for instance, the obtained device identification is 12 01 00 02 00 00 00 40 ac 05 ab 12 50 02 01 02 03 04h (little endian), in which, bytes from the ninth byte to the tenth byte mean the VID, which specifically is 05ach, and bytes from the eleventh byte to the twelfth byte mean the PID, which specifically is 12abh, and meanwhile, the PID meets the condition that $1290h \leq PID \leq 12afh$ and the VID meets the condition that $VID=05ach$.

Step 103, the apple accessory sets a device address for the apple device;

specifically, that the apple accessory sets the device address for the apple device includes: the apple accessory sends a setting-address request to the apple device; in the present Embodiment 2, the setting-address request specifically is 00 05 XX 00 00 00 00 00h, in which, XXh is the set address for the apple device, for instance 10h.

Step 104, the apple accessory obtains a current communications protocol configuration of the apple device;

specifically, Step 104 includes: the apple accessory generates an obtaining-identification request according to the preset configuration and sends the obtaining-identification request to the apple device, and then receives a data package group returned from the apple device, and looks up a configuration identification package from the data package group, and obtains a sixth byte of the configuration identification package to obtain the current communications protocol configuration of the apple device;

for instance, in Embodiment 2, the preset configuration is 04h, the obtaining-identification request, which is generated by the apple accessory according to the communications protocol configuration supported by the apple device, specifically is 80 06 04 02 00 00 75 00h.

Step 105, the apple accessory determines whether the current communications protocol configuration of the apple device is the preset configuration, if yes, goes to Step 107; otherwise, goes to Step 106;

in the present Embodiment 2, the preset configuration specifically is 04h.

Step 106, the apple accessory sets the current communications protocol configuration of the apple device as the preset configuration, and goes to Step 107;

specifically, Step 106 includes: the apple accessory generates the setting-identification request according to the communications protocol configuration supported by the apple device, and sends the setting-identification request to the apple device;

for instance, in Embodiment 2, the preset configuration is 04h, the setting-identification request, which is generated by the apple accessory according to the preset configuration, specifically is 00 09 04 00 00 00 00 00h.

Step 107, the apple accessory notifies the apple device to register the apple accessory with the apple device by sending a first preset data package to the apple device;

specifically, the first data package is a version package, whose format is:

| protocol (32 bytes) | length (32 bytes) |
|---|---|
| major (32 bytes) | minor (32 bytes) |
| padding (32 bytes) | | in Embodiment 2, the version package in Step 107 specifically is
00000000000000000000000000000000000000000000
00000000000000010100000000000000000000000000
00010000000000000000000000000000000000000000
000000000000000 00000000b.

Step 108, the apple accessory receives a first answer data package returned from the apple device;

in Embodiment 2, the first answer data package returned from the apple device specifically is the version package.

Step 109, the apple accessory determines whether the apple device registers the apple accessory with the apple device successfully according to the first answer data package returned from the apple device, if yes, goes to Step 110; otherwise, the connection is not built, and goes back to Step 101;

specifically, that the apple accessory determines whether the apple device registers the apple accessory with the apple device successfully according to the first answer data package returned from the apple device includes: the apple accessory determines whether a major field in the first answer data package is 02h, if yes, the apple device registers the apple accessory with the apple device successfully; otherwise, the apple device registers the apple accessory with the apple device unsuccessfully.

Step 110, the apple accessory builds a connection with the apple device by sending a second preset data package and a third preset data package to the apple device successively;

specifically, the second preset data package is a setup package, whose format is:

| protocol (32 bytes) | length (32 bytes) | |
|---|---|---|
| magic (32 bytes) | tx (16 bytes) | rx (byte) |
| data | | |

The sent setup package in Step 110 specifically is
00000000000000000000000000000001000000000000
00000000000000010001111111101110110111110101100
11100000000000000000011111111111111100000111b;

the third preset data package is a tcp package, whose format is:

| protocol (32 bytes) | length (32 bytes) | | | |
|---|---|---|---|---|
| magic (32 bytes) | tx (16 bytes) | | | rx (16 bytes) |
| sport (16 bytes) | dport (16 bytes) | seq (32 bytes) | | |
| ack (32 bytes) | x2 (6 bytes) | off (4 bytes) | flags (6 bytes) | win (16 bytes) |
| sum (16 bytes) | urp (16 bytes) | data | | | in which, sport is a resource port number, dport is a destination port number, seq is a sequence number, ack is a confirm sequence number, off is a data offset, x2 is a reserved field; flags is a flag field, it means emergence in the case that flags=100000b, it means confirmation in the case that flags=010000b, it means pushing in the case that flags=001000b, it means resetting in the case that flags=000100b, it means synchronization in the case that flags=000010b, and it means ending in the case that flags=000001b; win is a receiving window, sum is a check sum, and urp is a emergence pointer;

protocol in the tcp package which is sent in Step 110 is 00000000000000000000000000000110b, length is filled according to a length of the tcp package, magic is 11111110111011011111101011001110b, tx ans rx are filled according to the number of tcp packages which are sent or received, sport and dport are filled according to the port number of the current device and the port number of the apple device respectively, both of seq and ack are 00000000000000000000000000000001b, win is 0000001000000000b, and flags is 000010b.

Step 111, the apple accessory receives a second answer data package returned from the apple device;

in Embodiment 2, the second answer data package returned from the apple device specifically is a control package, whose format is:

| Protocol (32 bytes) | Length (32 bytes) | |
|---|---|---|
| magic (32 bytes) | tx (16 bytes) | rx (byte) |
| data | | |

Step 112, the apple accessory determines whether the connection with the apple device is built successfully according to the second answer data package returned from the apple device, if yes, goes to Step 113; otherwise, the connection with the apple device is built unsuccessfully, and goes back to Step 101;

specifically, that the apple accessory determines whether connection with the apple device is built successfully according to the second answer data package returned from the apple device includes: the apple accessory determines whether real data, which is included in the second answer data package returned from the apple device, is the preset data, if yes, the connection with the apple device is built successfully; otherwise, the connection with the apple device is built unsuccessfully;

preferably, the real data in a fourth preset data package is data, the preset data is 00000111b.

Step 113, the apple accessory inquires regularly whether any communication data sent from the apple device exists, and goes to Step 114 in the case that any communication data exists;

Step 114, the apple accessory receives the communication data sent from the apple device, and communicates with the apple device.

For instance, that the apple accessory receives the communication data sent from the apple device and communicates with the apple device can includes: the apple accessory receives the communication data sent from the apple device, and performs an operation on a card, which is connected to the apple accessory, according to data content included in the received communication data, and then returns a response to the apple device, in which, the operation may be powering on or powering off the card or reading or writing, etc; or can include: the apple accessory receives the communication data sent from the apple device, and generates a key pair and performs the operation of signing according to the data content included in the received communication data; and the present Embodiment 2 will not limit the scope.

Furthermore, in Embodiment 2, the apple accessory packages data, which needs to be sent, into a data package according to the transmission control protocol and sends the data package to the apple device when the apple accessory needs to send data to the apple device;

the apple accessory checks a flag field of the received data package when the apple accessory receives a data package sent from the apple device, and obtains the real data in the received data package, and sends an answer data package to the apple device in the case that the flag field is a first preset flag; the communication is finished and cuts off the connection with the apple device in the case that the flag field is a second preset flag;

preferably, the flag field is the first preset flag in the case that the flag field is 010000b; the flag field is the second preset flag in the case that the flag field is 000100b.

In the present Embodiment 2, the apple accessory has a power supply itself, and can supply power for the apple device which connects to the apple accessory.

Embodiment 3

Figure 3:
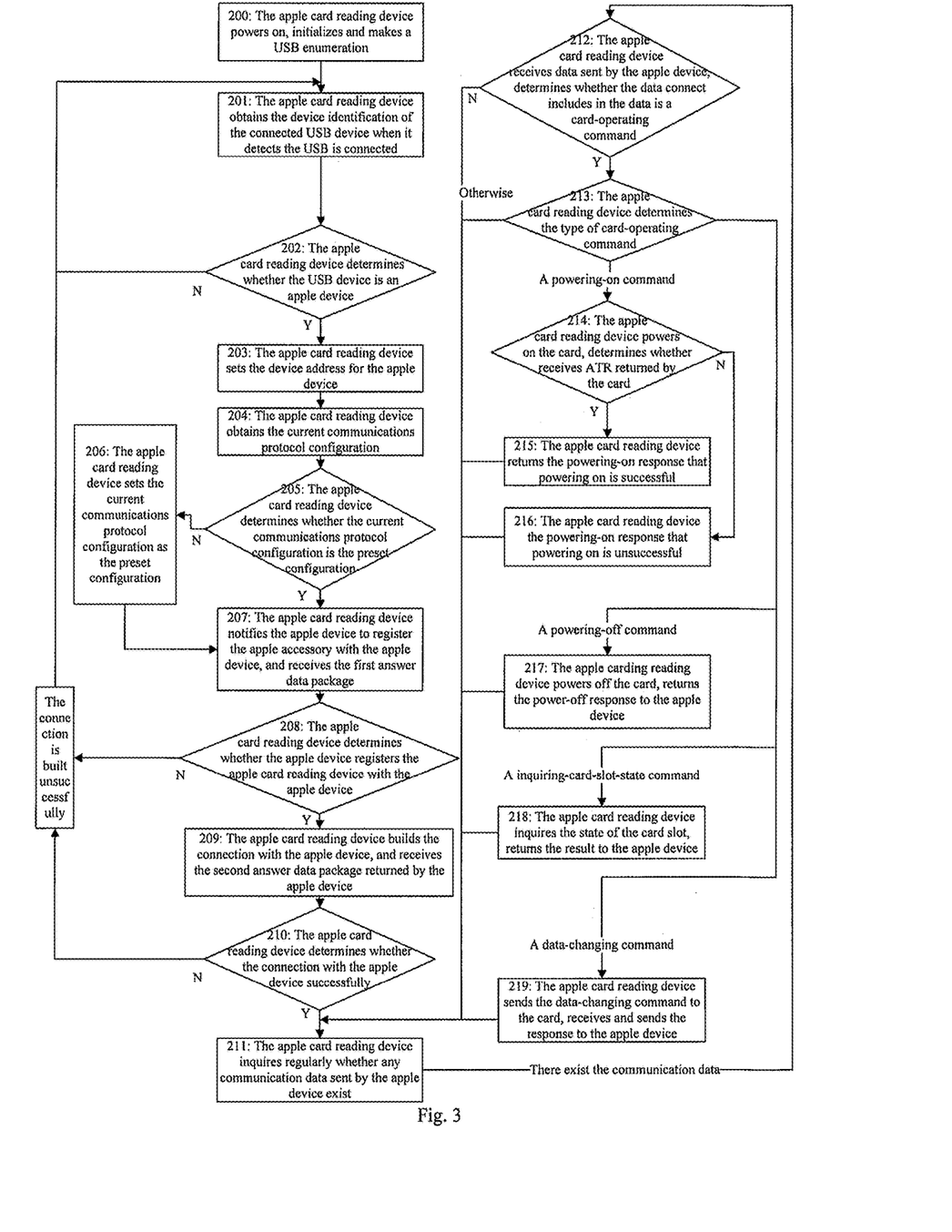
FIG. 3 provides a flow chart of a method for an apple accessory connecting to an apple initiatively and communicating with the apple device according to Embodiment 3 of the present invention.

The present Embodiment 3 provides a method for connecting to an apple device initiatively and communicating with the apple device by an apple accessory on the basis of Embodiment 1, in the said method, the apple accessory specifically is an apple card reading device which has a power supply itself and can supply power for the apple device when connecting to the apple device. As shown in FIG. 3, the method specifically includes:

Step 200, the apple card reading device powers on, initializes and performs a USB enumeration;

Step 201, the apple card reading device obtains a device identification of a USB device which is connected to the apple card reading device when the apple card reading device detects the USB device is connected to the apple card reading device;

Step 202, the apple card reading device determines whether the connected USB device is an apple device according to the obtained device identification, if yes, goes to Step 203; otherwise, goes back to Step 201;

Step 203, the apple card reading device sets a device address for the apple device;

Step 204, the apple card reading device obtains a current communications protocol configuration of the apple device;

Step 205, the apple card reading device determines whether the current communications protocol configuration of the apple device is a preset configuration, if yes, goes to Step 207; otherwise, goes to Step 206;

Step 206, the apple card reading device sets the current communications protocol configuration of the apple device as the preset configuration, and goes to Step 207;

Step 207, the apple card reading device notifies the apple device to register the apple accessory with the apple device, and receives a first answer data package returned from the apple device;

Step 208, the apple card reading device determines whether the apple device registers the apple accessory with the apple device successfully according to the first answer data package returned from the apple device, if yes, goes to Step 209; otherwise, the connection is built unsuccessfully, and goes back to Step 201;

Step 209, the apple card reading device builds a connection with the apple device, and receives a second answer data package returned from the apple device;

Step 210, the apple card reading device determines whether the apple card reading device builds the connection with the apple device successfully according to the second answer data package returned from the apple device, if yes, goes to Step 211; otherwise, the connection is built unsuccessfully, and goes back to Step 201;

Step 211, the apple card reading device inquires regularly whether any communication data sent from the apple device exists, goes to Step 212 when the communication data sent from the apple device is detected;

Step 212, the apple card reading device receives the communication data sent from the apple device, and determines whether data content included in the received data is a card-operating command, if yes, goes to Step 213; otherwise, goes back to Step 211;

in Embodiment 3, the card-operating command is a command which complies with the CCID standard.

Step 213, the apple card reading device determines a type of the card-operating command, goes to Step 214 in the case that the card-operating command is a powering-on command; goes to Step 217 in the case that the card-operating command is a powering-off command; goes to Step 218 in the case that the card-operating command is an inquiring-card-slot-state command; goes to Step 219 in the case that the card-operating command is a data-changing command; otherwise, goes back to Step 211;

Step 214, the apple card reading device powers on a card, and determines whether ATR (answer to reset) returned from the card is received, if yes, goes to Step 215; otherwise, goes to Step 216;

in which, the ATR is answer to reset, and the card is a card which connects to the apple card reading device.

Step 215, the apple card reading device returns a powering-on response that powering on is successful, and goes back to Step 211;

Step 216, the apple card reading device returns a powering-on response that the powering on is unsuccessful, and goes back to Step 211;

Step 217, the apple card reading device powers off the card, and returns a powering-off response to the apple device, and goes back to Step 211;

Step 218, the apple card reading device inquires a state of the card slot, and returns a result to the apple device, and goes back to Step 211;

Step 219, the apple card reading device sends the data-changing command to the card, and receives an answer returned from the card and sends the answer to the apple device, and goes back to Step 211.

Embodiment 4

Figure 4:
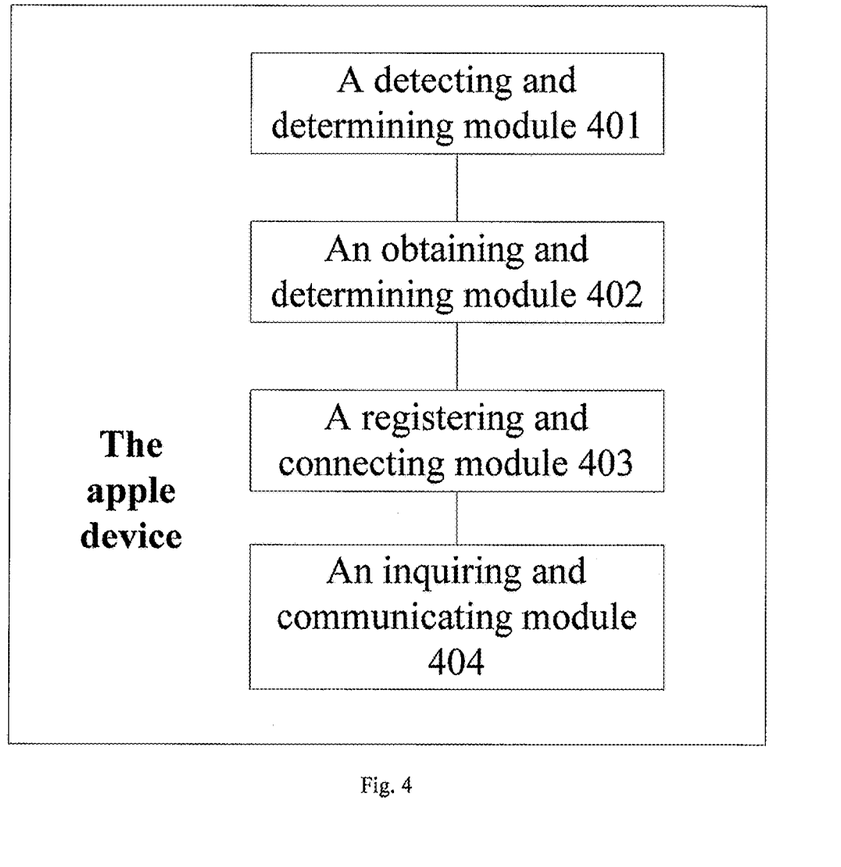
FIG. 4 provides a block diagram of an apple accessory according to Embodiment 4 of the present invention.

Embodiment 4 of the present invention provides an apple accessory, as shown in FIG. 4, the apple accessory includes:

a detecting and determining module 401 which is configured to determine whether a USB device, which is connected to the apple accessory, is an apple device when the detecting and determining module 401 detects that the USB device is connected to the apple accessory, and to set an address for the apple device in the case that the USB device is an apple device;

an obtaining and determining module 402 which is configured to obtain the current communications protocol configuration of the apple device, and to determine whether the current communications protocol configuration of the apple device is the preset configuration, and to set the current communications protocol configuration of the apple device as the preset configuration in the case that the current communications protocol configuration is not the preset configuration;

a registering and connecting module 403 which is configured to notify the apple device to register the apple accessory with the apple device, and to build a connection with the apple device; and an inquiring and communicating module 404 which is configured to inquire regularly whether any communication data sent from the apple device exist, and to receive communication data sent from the apple device in the case that the communication data sent from the apple device is detected, and to communicate with the apple device.

In the present Embodiment 4, determining whether the USB device which is connected to the apple accessory is an apple device specifically includes: the detecting and determining module 401 sends an obtaining-device-identification request to the USB device, and receives a device identification returned from the USB device, and determines whether the device identification returned from the USB device meets a preset condition, if yes, the connected USB device is an apple device; otherwise, the connected USB device is not an apple device;

determining whether the obtained device identification meets the preset condition specifically includes: the detecting and determining module 401 checks a product identification and a vendor identification in the obtained device identification, the obtained device identification meets the preset condition in the case that the product identification is in a preset range and the vendor identification equals to the first preset value; otherwise, the obtained device identification does not meet the preset condition;

setting the device address for the apple device specifically includes: the checking and determining module 401 sends a setting-address request to the apple device;

obtaining the current communications protocol configuration of the apple device specifically includes: the obtaining and determining module 402 generates an obtaining-identification request according to the preset configuration and sends the obtaining-identification request to the apple device, and then receives a data package group returned from the apple device, and looks up a configuration identification package in the data package group, and obtains the current communications protocol configuration of the apple device from the configuration identification package;

setting the current communications protocol configuration of the apple device as the preset configuration specifically includes: the obtaining and determining module 402 generates the setting-identification request according to the preset configuration and sends the setting-identification request to the apple device;

the registering and connecting module 403 is further configured to receive the first answer data package returned from the apple device, and to determine whether the apple device registers the apple accessory with the apple device successfully according to the first answer data package returned from the apple device; correspondingly, the registering and connecting module 403 is further configured to build a connection between the apple accessory and the apple device in the case that the apple device registers the apple accessory with the apple device successfully;

determining whether the apple device registers the apple accessory with the apple device successfully according to the first answer data package returned from the apple device specifically includes: the registering and connecting module 403 determines whether the preset field in the first answer data package returned from the apple device equals to the second preset value, if yes, the apple device registers the apple accessory with the apple device successfully; otherwise, the apple device registers the apple accessory with the apple device unsuccessfully;

the registering and connecting module 403 is further configured to receive the second answer data package returned from the apple device, and to determine whether the connection with the apple device is built successfully according to the second answer data package returned from the apple device; correspondingly, the inquiring and communicating module 404 is specifically configured to inquire regularly whether any communication data sent from the apple device exists after the registering and connecting module 403 determines the connection with the apple device is built successfully, and to receive the communication data sent from the apple device in the case that the communication data sent from the apple device is inquired, and to communicate with the apple device;

determining whether the connection with the apple device is built successfully according to the second answer data package returned from the apple device specifically includes: the registering and connecting module 403 determines whether the real data, which is included in the second answer data package returned from the apple device, is the preset data, if yes, the connection with the apple device is built successfully; otherwise, the connection with the apple device is built unsuccessfully.

The Embodiments described herein are just preferable Embodiments of the present invention. On the basis of the Embodiments of the invention, all other related Embodiments made by those skilled in the art without any inventive work belong to the scope of protection of the present invention.

The invention claimed is:

1. A method for connecting initiatively to and communicating with an iOS device, wherein said method comprises the following steps:
    S1) determining, by an iOS accessory, whether a USB device which is connected to the iOS accessory is an iOS device when the iOS accessory detects that the USB device is connected to the iOS accessory, if yes, setting a device address for the iOS device, and going to Step S2; otherwise, going back to Step S1;
    S2) obtaining, by the iOS accessory, a current communications protocol configuration of the iOS device, and determining whether the current communications protocol configuration of the iOS device is a preset configuration, if yes, going to Step S3; otherwise, setting the current communications protocol configuration of the iOS device as the preset configuration, and going to Step S3;
    S3) notifying, by the iOS accessory, the iOS device to register the iOS accessory with the iOS device, and building a connection with the iOS device; and
    S4) inquiring regularly, by the iOS accessory, whether any communication data sent from the iOS device exists, receiving the communication data sent from the iOS device in the case that the communication data sent from the iOS device is inquired, and communicating with the iOS device.

2. The method as claimed in claim 1, wherein the iOS accessory determining whether the USB device which is connected to the iOS accessory is an iOS device specifically comprises: sending, by the iOS accessory, an obtaining-device-identification request to the connected USB device, and receiving a device identification returned from the connected USB device, and then determining whether the received device identification meets a preset condition, if yes, confirming that the connected USB device is an iOS device; otherwise, confirming that the connected USB device is not an iOS device.

3. The method as claimed in claim 2, wherein the iOS accessory determining whether the received device identification meets a preset condition specifically comprises: checking, by the iOS accessory, a product identification and a vendor identification in the received device identification, confirming that the received device identification meets the preset condition in the case that the product identification is in a preset range and the vendor identification equals a first preset value; otherwise, confirming that the received device identification does not meet the preset condition.

4. The method as claimed in claim 1, wherein the iOS accessory setting the device address for the iOS device specifically comprises: sending, by the iOS accessory, a setting-address request to the iOS device.

5. The method as claimed in claim 1 wherein the iOS accessory obtaining the current communications protocol configuration of the iOS device specifically comprises: generating, by the iOS accessory, an obtaining-identification request according to the preset configuration and sending the obtaining-identification request to the iOS device, receiving a data package group returned from the iOS device, looking up a configuration identification package from the data package group, and obtaining the current communications protocol configuration of the iOS device from the configuration identification package.

6. The method as claimed in claim 1, wherein the iOS accessory setting the current communications protocol configuration of the iOS device as the preset configuration specifically comprises: generating, by the iOS accessory, a setting-identification request according to the preset configuration and sending the setting-identification request to the iOS device.

7. The method as claimed in claim 1, wherein after the iOS accessory notifies the iOS device to register the iOS accessory with the iOS device, the method further comprises: receiving, by the iOS accessory, a first answer data package returned from the iOS device, and determining whether the iOS device registers the iOS accessory with the iOS device successfully according to the first answer data package returned from the iOS device, if yes, continuing to build the connection with the iOS device; otherwise, going back to Step S1.

8. The method as claimed in claim 7, wherein the iOS accessory determining whether the iOS device registers the iOS accessory with the iOS device successfully according to the first answer data package returned from the iOS device specifically comprises: determining, by the iOS accessory, whether a preset field in the first answer data package returned from the iOS device equals to a second preset value, if yes, confirming that the iOS device registers the iOS accessory with the iOS device successfully; otherwise, confirming that the iOS device registers the iOS accessory with the iOS device unsuccessfully.

9. The method as claimed in claim 1, wherein after the iOS accessory builds the connection with the iOS device, the method further comprises: receiving, by the iOS accessory, a second answer data package returned from the iOS device, and determining whether the iOS accessory builds the connection with the iOS device successfully according to the second answer data package returned from the iOS device, if yes, continuing to execute Step S4; otherwise, going back to Step S1.

10. The method as claimed in claim 9, wherein the iOS accessory determining whether the iOS accessory builds the connection with the iOS device successfully according to the second answer data package returned from the iOS device specifically comprises: determining, by the iOS accessory, whether real data, which is included in the second answer data package returned from the iOS device, is a preset data, if yes, confirming that the iOS accessory builds the connection with the iOS device successfully; otherwise, confirming that the iOS accessory builds the connection with the iOS device unsuccessfully.

11. An iOS accessory, wherein said accessory comprises:
    a detecting and determining module which is configured to determine whether a connected USB device is an iOS device when the module detects a USB device is connected to the iOS accessory, and to set a device address for the iOS device in the case that the connected USB device is an iOS device;
    an obtaining and determining module which is configured to obtain a current communications protocol configuration of the iOS device, and to determine whether the current communications protocol configuration of the iOS device is a preset configuration, and to set the current communications protocol configuration of the iOS device as the preset configuration in the case that the current communications protocol configuration of the iOS device is not the preset configuration;
    a registering and connecting module which is configured to notify the iOS device to register the iOS accessory with the iOS device, and to build a connection between the iOS accessory and the iOS device; and an inquiring and communicating module which is configured to inquire regularly whether any communication data sent from the iOS device exists, and to receive the communication data sent from the iOS device in the case that the module determines that there exists communication data sent from the iOS device, and to communicate with the iOS device.

12. The iOS accessory as claimed in claim 11, wherein the detecting and determining module determining whether the connected USB device is an iOS device specifically comprises: sending, by the detecting and determining module, an obtaining-device-identification request to the connected USB device, and receiving a device identification returned from the connected USB device, and determining whether the device identification meets a preset condition, if yes, confirming that the connected USB device is an iOS device; otherwise, confirming that the connected USB device is not an iOS device.

13. The iOS accessory as claimed in claim 12, wherein the detecting and determining module determining whether the obtained device identification meets the preset condition specifically comprises: checking, by the detecting and determining module, a product identification and a vendor identification, which are included in the obtained device identification, confirming that the obtained device identification meets the preset condition in the case that the product identification is in a preset range and the vendor identification equals to a first preset value; otherwise, confirming that the obtained device identification does not meet the preset condition.

14. The iOS accessory as claimed in claim 11, wherein the detecting and the determining module setting the device address for the iOS device specifically comprises: sending, by the detecting and determining module, a setting-address request to the iOS device.

15. The iOS accessory as claimed in claim 11, wherein the obtaining and determining module obtaining the current communications protocol configuration of the iOS device specifically comprises: generating, by the obtaining and determining module, an obtaining-identification request according to the preset configuration and sending the obtaining-identification request to the iOS device, and receiving a data package group returned from the iOS device, and looking up a configuration identification package which is in the data package group, and obtaining the current communications protocol configuration of the iOS device from the configuration identification package.

16. The iOS accessory as claimed in claim 11, wherein the obtaining and determining module setting the current communications protocol configuration of the iOS device as the preset configuration specifically comprises: generating, by the obtaining and determining module, a setting-identification request according to the preset configuration, and sending the setting-identification request to the iOS device.

17. The iOS accessory as claimed in claim 11, wherein the registering and connecting module is further configured to receive a first answer data package returned from the iOS device, and to determine whether the iOS device registers the iOS accessory with the iOS device successfully according to the first answer data package returned from the iOS device;

the registering and connecting module is specifically configured to build a connection between the iOS accessory and the iOS device in the case that the iOS device registers the iOS accessory with the iOS device successfully.

18. The iOS accessory as claimed in claim 17, wherein the registering and connecting module determining whether the iOS device registers the iOS accessory with the iOS device successfully according to the first answer data package returned from the iOS device specifically comprises: determining, by the registering and connecting module, whether a preset field in the first answer data package returned from the iOS device equals to the second preset value, if yes, confirming that the iOS device registers the iOS accessory with the iOS device successfully; otherwise, confirming that the iOS device registers the iOS accessory with the iOS device unsuccessfully.

19. The iOS accessory as claimed in claim 11, wherein the registering and connecting module is further configured to receive a second answer data package returned from the iOS device, and to determine whether the connection with the iOS device is built successfully according to the second answer data package returned from the iOS device;

the inquiring and communicating module is specifically configured to inquire regularly whether any communication data sent from the iOS device exists when the registering and connecting module determines that the connection with the iOS device is built successfully, and to receive the communication data sent from the iOS device when there exists communication data sent from the iOS device, and to communicate with the iOS device.

20. The iOS accessory as claimed in claim 19, wherein the registering and connecting module determining whether the connection with the iOS device is built successfully according to the second answer data package returned from the iOS device specifically comprises: determining, by the registering and connecting module, whether real data, which is included in the second response data package, is the preset data, if yes, confirming that the iOS accessory connects to the iOS device successfully; otherwise, confirming that the iOS accessory connects to the iOS device unsuccessfully.

* * * * *